United States Patent [19]

Takanashi et al.

[11] Patent Number: 5,025,209
[45] Date of Patent: Jun. 18, 1991

[54] APPARATUS FOR DETECTING SURFACE POTENTIAL DISTRIBUTION

[75] Inventors: Itsuo Takanashi, Kamakura; Shintaro Nakagaki, Fujisawa; Hirohiko Shinonaga; Tsutou Asakura, both of Yokohama; Masato Furuya; Hiromichi Tai, both of Yokosuka, all of Japan

[73] Assignee: Victor Company of Japan, Ltd., Japan

[21] Appl. No.: 372,507

[22] Filed: Jun. 28, 1989

[30] Foreign Application Priority Data

Jun. 30, 1988 [JP] Japan .................. 63-163477
Sep. 6, 1988 [JP] Japan .................. 63-223167
Sep. 20, 1988 [JP] Japan .................. 63-235407

[51] Int. Cl.⁵ .................. G01R 31/00; G02F 1/03
[52] U.S. Cl. .................. 324/96; 350/356; 350/384
[58] Field of Search .............. 350/384, 385, 392, 356; 324/96; 382/1

[56] References Cited

U.S. PATENT DOCUMENTS

| | | | |
|---|---|---|---|
| 3,691,484 | 9/1972 | Dore | 332/7.51 |
| 4,761,607 | 8/1988 | Shiragasawa et al. | 324/158 R |
| 4,855,591 | 8/1989 | Nakamura et al. | 250/225 |
| 4,891,579 | 1/1990 | Aoshima et al. | 324/96 |
| 4,894,607 | 1/1990 | Kumada | 324/96 |
| 4,906,922 | 3/1990 | Takahashi et al. | 324/158 R |

FOREIGN PATENT DOCUMENTS 2011575 10/1975 European Pat. Off. .
2140649 11/1984 European Pat. Off. .
58-3478 1/1983 Japan .
61-9085 1/1986 Japan .

OTHER PUBLICATIONS

Applied Optics, vol. 18, No. 12, Jun. 1979, New York, pp. 1895–1899, S. Jost and B. J. Pernick: "Temporal Measurements in the Spatial Frequency Spectrum of Liquid Crystal Image Transducers".

Primary Examiner—Leo H. Boudreau
Assistant Examiner—Steven Klocinski
Attorney, Agent, or Firm—Lowe, Price, LeBlanc & Becker

[57] ABSTRACT

An apparatus for detecting a distribution of a surface potential on a measured object comprises a reading head opposing the measured object. The reading head includes an optical modulator subjected to an electric field representative of the surface potential distribution. The electric field applied to the optical modulator is varied in an alternating manner.

2 Claims, 7 Drawing Sheets

APPARATUS FOR DETECTING SURFACE POTENTIAL DISTRIBUTION

BACKGROUND OF THE INVENTION

This invention relates to an apparatus for detecting the distribution of a surface potential.

The applicant previously proposed an imaging system and a recording system in which an imaging apparatus used photo-photo conversion elements to generate an optical image with a high resolution, and the optical image was recorded on a recording medium as a charge latent image by use of photo-charge conversion elements. The applicant also proposed an apparatus for detecting the distribution of a surface potential which was used in reading out the charge latent image from the recording medium and thus generating an electric signal representative of the charge latent image.

SUMMARY OF THE INVENTION

It is an object of this invention to provide an advanced apparatus for detecting the distribution of a surface potential.

According to a first aspect of this invention, an apparatus for detecting a distribution of a surface potential on a measured object comprises a light source emitting light; a sensing head opposing the measured object and including an optical modulator layer for modulating the light emitted from the light source, a transparent electrode for applying an electric field to the optical modulator layer, and a dielectric mirror for reflecting the light after the light passes through the optical modulator layer; means for applying the light from the light source to the sensing head; means for detecting the light outputted from the sensing head; and means for periodically moving the sensing head relative to the measured object between a first position and a second position separated from the measured object by different distances respectively.

According to a second aspect of this invention, an apparatus for detecting a distribution of a surface potential on a measured object comprises a reading head opposing the measured object and including an optical modulator subjected to an electric field representative of the surface potential distribution; and means for varying the electric field applied to the optical modulator in an alternating manner.

According to a third aspect of this invention, an apparatus comprises a recording member having first regions and second regions alternating with each other, the first regions having first-type potentials and the second regions having second-type potentials different from the first-type potentials; means for forming a charge latent image on the recording member in accordance with an information signal; a reading head opposing the recording member and including an optical modulator subjected to an electric field representative of the charge latent image; and means for reciprocating the reading head relative to the recording member along a surface of the recording member to vary the electric field applied to the optical modulator in an alternating manner.

BRIEF DESCRIPTION OF THE DRAWINGS

Like and corresponding elements are denoted by the same reference characters throughout the drawings.

DESCRIPTION OF THE FIRST PREFERRED EMBODIMENT

Figure 1:
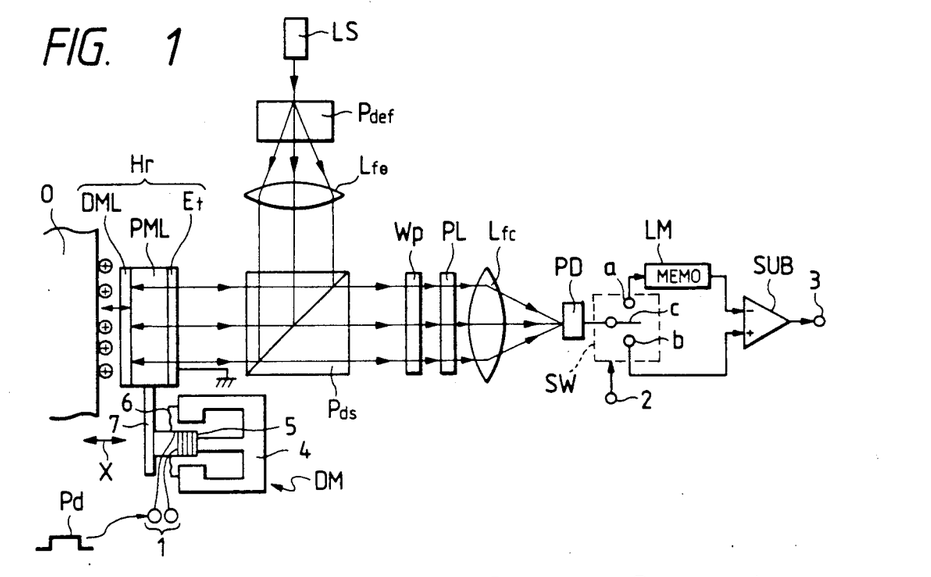
FIG. 1 is a diagram of an apparatus according to a first embodiment of this invention.

With reference to FIG. 1, a laser LS emits a beam of light which travels to a lens Lfθ via an optical deflector Pdef. The optical deflector Pdef functions to deflect the light beam to attain a scanning process. The light beam passes through the lens Lfθ and then enters a beam splitter Pds. The beam splitter Pds reflects the incident light beam toward a reading (sensing) or reproducing head Hr. The lens Lfθ imparts a constant linear scanning speed to the light beam incident to the reading head Hr.

The reading head Hr has a laminated structure of a transparent electrode layer Et, an optical modulator layer PML, and a dielectric mirror layer DML. The optical modulator layer PML is sandwiched between the transparent electrode layer Et and the dielectric mirror layer DML. The dielectric mirror layer DML is opposed to a recording medium or a measured object O while the transparent electrode layer Et is remote from the recording medium O. The light beam from the beam splitter Pds enters the optical modulator layer PML via the transparent electrode layer Et. The optical modulator layer PML is made of material which varies the condition of light in response to an applied potential.

One example of the material for the optical modulator layer PML is a single crystal of lithium niobate which has the electrooptic effect.

A drive mechanism DM periodically moves the reading head Hr between predetermined first and second positions where the reading head Hr is close to and remote from the measured object O respectively. The drive mechanism DM is controlled by a drive signal Pd applied to an input terminal 1. It should be noted that the drive mechanism DM may be designed to periodically move the measured object O back and forth relative to the reading head Hr.

The drive mechanism DM includes a magnetic field generator 4, an armature having a winding 5, a central holder 6, and a connector 7 coupling the armature and the reading head Hr. The winding 5 is electrically connected to the input terminal 1. The application of the drive signal Pd to the winding 5 via the input terminal 1 reciprocates the armature in the direction X, moving the reading head Hr between the first and second positions.

The light beam from the beam splitter Pds enters the optical modulator layer PML of the reading head Hr via the transparent electrode layer Et. The light beam passes through the optical modulator layer PML and reaches the dielectric mirror layer DML. Then, the light beam is reflected by the dielectric mirror layer DML and returns to the beam splitter Pds via the optical modulator layer PML and the electrode layer Et.

The optical modulator layer PML of the reading head Hr is subjected via the dielectric mirror layer DML to the electric field which depends on the charge latent image formed on the measured object O. Therefore, a condition of the light beam passing through the optical modulator layer PML varies with the electric field so that the light beam carries information related to the charge latent image. Specifically, the angle of the polarization plane of the light beam varies with the charge latent image.

The signal light beam outputted from the reading head Hr passes through the beam splitter Pds and then reaches a condenser lens Lfc via a wave plate WP and a polarizer PL. The wave plate WP functions to adjust the used quantity of the signal light beam. The polarizer PL functions to convert the angle of the polarization plane of the signal light beam into a brightness of the signal light beam. The condenser lens Lfc focuses the signal light beam on a photodetector PD. The photodetector PD converts the signal light beam into a corresponding electric signal whose amplitude represents the charge latent image.

The optical deflector Pdef functions to deflect the light beam to attain a line-by-line scanning process. As the light beam is deflected by the optical deflector Pdef, the light beam in the optical modulator layer PML shifts in the direction perpendicular to the active surface of the measured object O. The light beam in the optical modulator layer PML carries information of a segment of the charge latent image which directly opposes the position of the light beam. Accordingly, when the light beam in the optical modulator layer PML shifts two-dimensionally in directions perpendicular to the active surface of the measured object O by the optical deflector Pdef, the charge latent image is scanned two-dimensionally in a line-by-line manner via the light beam and the photodetector PD outputs a time-series video signal representative of the charge latent image. In the case where the diameter of the light beam in the optical modulator layer PML is 1 micrometer, the available video signal has a resolution of 1000 lines per millimeter.

As described previously, the reading head Hr is moved between the first and second positions by the drive mechanism DM. When the reading head Hr is in the first position at which the reading head Hr is close to the measured object O, the charge latent image formed on the measured object O is detected by the reading head Hr. When the reading head Hr is in the second position at which the reading head Hr is remote from the measured object O, the reading head Hr senses the unevenness in the thickness of the optical modulator layer PML without detecting the charge latent image.

The output signal from the photodetector PD is applied to a movable contact "c" of a switch SW. The movable contact "c" is connected with either a fixed contact "a" or a fixed contact "b" of the switch SW. The connection of the movable contact "c" to one of the fixed contacts "a" and "b" is changed at a predetermined period by a control signal fed to an input terminal 2. The fixed contact "a" of the switch SW is connected to the input terminal of a 1-line memory LM. The output terminal of the 1-line memory LM is connected to a first input terminal of a subtracter SUB. The fixed contact "b" of the switch SW is connected to a second input terminal of the subtracter SUB. The output terminal of the subtracter SUB is connected to an apparatus output terminal 3.

Figure 2:
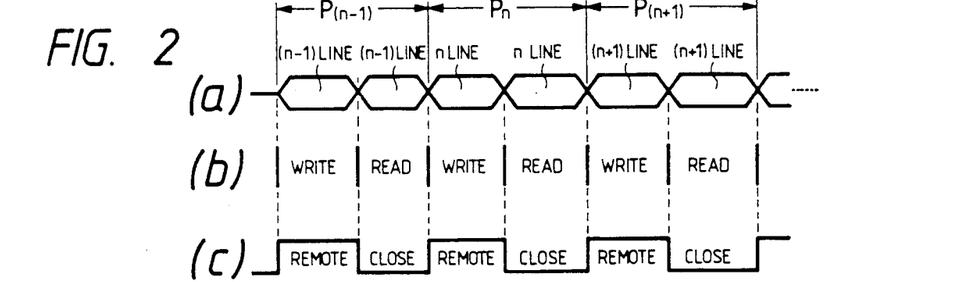
FIG. 2 is a timing diagram showing the operation of the apparatus of FIG. 1.

FIG. 2 shows the timing relation among the horizontal scanning periods (see part (a)), the mode of operation of the 1-line memory LM (see part (b)), and the position of the reading head Hr (see part (c)). As shown in FIG. 2, during a first half of a period $P_{n-1}$, and n−1-th line is scanned and the reading head Hr remains in the second position where the reading head Hr is remote from the measured object O. During this first half of the period $P_{n-1}$, the output signal from the photodetector PD represents the unevenness of the optical modulator layer PML, and this signal is transmitted to the 1-line memory LM via the switch SW and is written into the 1-line memory LM as a reference signal representative of the unevenness of the optical modulator layer PML. During a second half of the period $P_{n-1}$, the n−1−th line is scanned again and the reading head Hr remains in the first position where the reading head Hr is close to the measured object O. During this second half of the period $P_{n-1}$, the output signal from the photodetector PD represents the charge latent image formed on the measured object O, and this signal is transmitted via the switch SW to the subtracter SUB as an effective video signal. During the second half of the period $P_{n-1}$, the reference signal is read out from the 1-line memory LM and is transmitted to the subtracter SUB. The subtracter SUB subtracts the reference signal from the effective video signal to obtain an accurate video signal fed to the output terminal 3. In this way, the error components caused by the unevenness of the optical modulator layer PML are removed from the video signal.

During a first half of a subsequent period Pn, an n-th line is scanned and the reading head Hr remains in the second position where the reading head Hr is remote from the measured object O. During this first half of the period $P_n$, the output signal from the photodetector PD represents the unevenness of the optical modulator layer PML, and this signal is transmitted to the 1-line memory LM via the switch SW and is written into the 1-line memory LM as a reference signal representative of the unevenness of the optical modulator layer PML. During a second half of the period $P_n$, the n-th line is scanned again and the reading head Hr remains in the first position where the reading head Hr is close to the measured object O. During this second half of the period $P_n$, the output signal from the photodetector PD represents the charge latent image formed on the measured object O, and this signal is transmitted via the switch SW to the subtracter SUB as an effective video signal. During the second half of the period Pn, the reference signal is read out from the 1-line memory LM and is transmitted to the subtracter SUB. The subtracter SUB subtracts the reference signal from the effective video signal to obtain an accurate video signal fed to the output terminal 3. In this way, the error components caused by the unevenness of the optical modulator layer PML are removed from the video signal. During later periods $P_{n+1}$, $P_n+2$, . . . , similar operation is performed.

DESCRIPTION OF THE SECOND PREFERRED EMBODIMENT

Figure 3:
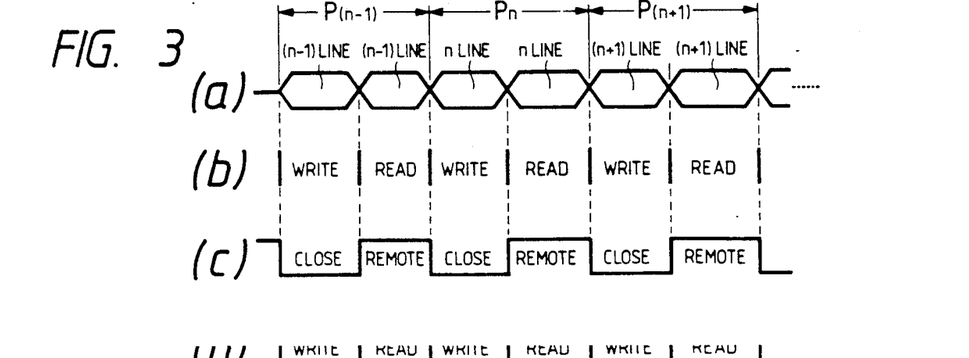
FIG. 3 is a timing diagram showing the operation of an apparatus according to a second embodiment of this invention.

FIG. 3 shows the timing relation among the horizontal scanning periods (see part (a)), the mode of operation of the 1-line memory LM (see part (b)), and the position of the reading head Hr (see part (c)) in a second embodiment of this invention which is similar to the embodiment of FIGS. 1 and 2 except for the following points.

During a first half of a period $P_{n-1}$, an n−1−-th line is scanned and the reading head Hr remains in the first position where the reading head Hr is close to the measured object O. During this first half of the period $P_{n-1}$, the output signal from the photodetector PD represents the charge latent image formed on the measured object O, and this signal is transmitted to the 1-line memory LM via the switch SW and is written into the 1-line memory LM as an effective video signal. During a second half of the period $P_{n-1}$, the n−1-th line is scanned again and the reading head Hr remains in the second position where the reading head Hr is remote from the measured object O. During this second half of the period $P_{n-1}$, the output signal from the photodetector PD represents the unevenness of the optical modulator layer PML, and this signal is transmitted via the switch SW to the subtracter SUB as a reference signal representative of the unevenness of the optical modulator layer PML. During the second half of the period $P_{n-1}$, the effective video signal is read out from the 1-line memory LM and is transmitted to the subtracter SUB. The subtracter SUB subtracts the reference signal from the effective video signal to obtain an accurate video signal fed to the output terminal 3. In this way, the error components caused by the unevenness of the optical modulator layer PML are removed from the video signal. During subsequent periods $P_n$, $P_{+1}$, $P_{n+2}$, . . . , similar operation is performed.

DESCRIPTION OF THE THIRD PREFERRED EMBODIMENT

Figure 4:
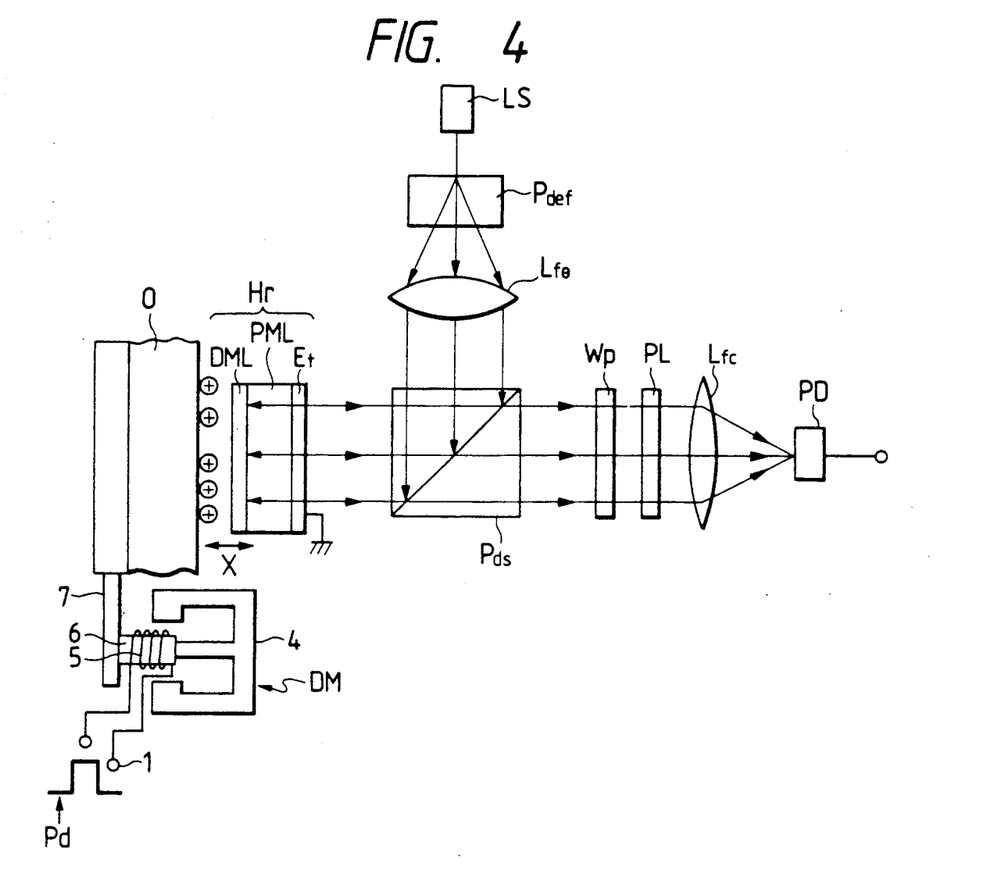
FIG. 4 is a diagram of an apparatus according to a third embodiment of this invention.

With reference to FIG. 4, a laser LS emits a beam of light which travels to a lens $Lf\theta$ via an optical deflector Pdef. The optical deflector Pdef functions to deflect the light beam to attain a scanning process. The light beam passes through the lens $Lf\theta$ and then enters a beam splitter Pds. The beam splitter Pds reflects the incident light beam toward a reading (sensing) or reproducing head Hr. The lens $Lf\theta$ imparts a constant linear scanning speed to the light beam incident to the reading head Hr.

The reading head Hr has a laminated structure of a transparent electrode layer Et, an optical modulator layer PML, and a dielectric mirror layer DML. The optical modulator layer PML is sandwiched between the transparent electrode layer Et and the dielectric mirror layer DML. The dielectric mirror layer DML is opposed to a recording medium or a measured object O while the transparent electrode layer Et is remote from the recording medium O. The light beam from the beam splitter Pds enters the optical modulator layer PML via the transparent electrode layer Et. The optical modulator layer PML is made of material which varies the condition of light in response to an applied potential. One example of the material for the optical modulator layer PML is a single crystal of lithium niobate which has the electrooptic effect. Another example is a nematic liquid crystal. The dielectric mirror layer DML has a multilayer structure.

As described previously, the light beam from the beam splitter Pds enters the optical modulator layer PML of the reading head Hr via the transparent electrode layer Et. The light beam passes through the optical modulator layer PML and reaches the dielectric mirror layer DML. Then, the light beam is reflected by the dielectric mirror layer DML and returns to the beam splitter Pds via the optical modulator layer PML and the electrode layer Et.

The optical modulator layer PML of the reading head Hr is subjected via the dielectric mirror layer DML to the electric field which depends on the charge latent image formed on the measured object O. Therefore, a condition of the light beam passing through the optical modulated layer PML varies with the electric field so that the light beam carries information related to the charge latent image. Specifically, the angle of the polarization plane of the light beam varies with the charge latent image.

The signal light beam outputted from the reading head Hr passes through the beam splitter Pds and then reaches a condenser lens Lfc via a wave plate WP and a polarizer or analyzer PL. The wave plate WP functions to adjust the used quantity of the signal light beam. The polarizer PL functions to convert the angle of the polarization plane of the signal light beam into a brightness of the signal light beam. The condenser lens Lfc focuses the signal light beam on a photodetector PD. The photodetector PD converts the signal light beam into a corresponding electric signal whose amplitude represents the charge latent image.

The optical deflector Pdef functions to deflect the light beam to attain a line-by-line scanning process. As the light beam is deflected by the optical deflector Pdef, the light beam in the optical modulator layer PML shifts in the direction perpendicular to the active surface of the measured object O. The light beam in the optical modulator layer PML carries information of a segment of the charge latent image which directly opposes the position of the light beam. Accordingly, when the light beam in the optical modulator layer PML shifts two-dimensionally in directions perpendicular to the active surface of the measured object O by the optical deflector Pdef, the charge latent image is scanned two-dimensionally in a line-by-line manner via the light beam and the photodetector PD outputs a time-series video signal representative of the charge latent image. In the case where the diameter of the light beam in the optical modulator layer PML is 1 micrometer, the available video signal has a resolution of 1000 lines per millimeter.

Figure 5:
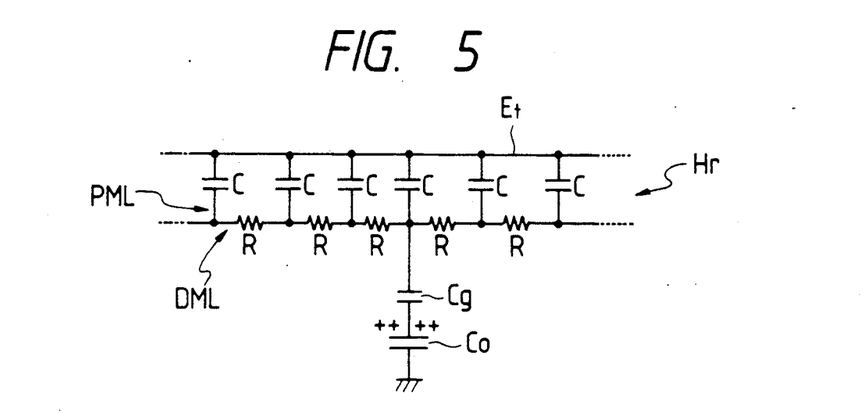
FIG. 5 is a schematic diagram of an equivalent circuit of the reading head of FIG. 4.

FIG. 5 shows an equivalent circuit of the reading head Hr and the measured object O. As shown in FIG. 5, the dielectric mirror layer DML has a series combination of resistances R extending along the plane thereof. The optical modulator layer PML has a parallel combination of capacitances C connected to the respective junctions between the resistances R. The capacitances C are connected in common to a line formed by the transparent electrode layer Et. The gap between the reading head Hr and the measured object O determines a capacitance Cg via which they are electrically connected. The measured object O has a capacitance Co.

The dielectric mirror layer DML and the optical modulator layer PML are subjected to electric fields whose distribution depends on the charge latent image formed on the measured object O. As understood from FIG. 5, the distribution of the electric field in the dielectric mirror layer DML tends to be gradually uniformized at a rate determined by the time constant (diffusing time constant) of the network of the resistances R and the capacitances C. Since the electric field in the optical modulator layer PML is affected by the electric field in the dielectric mirror layer DML, the signal electric field in the optical modulator layer PML also tends to be gradually uniformized and the resolution of the signal electric field is liable to gradually decrease. Accordingly, during the reproduction of a still image, the reproduced image could blur gradually. This embodiment resolves such a problem by use of the following arrangement.

A drive mechanism DM periodically moves the measured object O between predetermined first and second positions where the measured object O is close to and remote from the reading head Hr respectively. The drive mechanism DM is controlled by a drive signal Pd applied to an input terminal 1.

The drive mechanism DM includes a magnetic field generator 4, an armature having a winding 5, a central holder 6, and a connector 7 coupling the armature and the measured object O. The winding 5 is electrically connected to the input terminal 1. The application of the drive signal Pd to the winding 5 via the input terminal 1 reciprocates the armature in the direction X, moving the measured object O between the first and second positions.

When the measured object O is in the first position at which the measured object O is close to the reading head Hr, the reading head Hr is subjected to a strong electric field dependent upon the charge latent image formed on the measured object O. While the measured object O remains in the first position, the charge latent image formed on the measured object O is detected by the reading head Hr. When the measured object O is in the second position at which the measured object O is remote from the reading head Hr, the reading head Hr is substantially free from an electric field dependent upon the charge latent image formed on the measured object O. The frequency of the drive signal Pd is set in correspondence to the diffusing time constant of the reading head Hr. The periodical movement of the measured object O from the first position to the second position suppresses the previously-mentioned uniformization of the signal electric field in the optical modulator layer PML and thus ensures an adequate resolution of a reproduced still image.

It should be noted that the reading head Hr may be activated to detect the charge latent image when the measured object O is in the second position.

DESCRIPTION OF THE FOURTH PREFERRED EMBODIMENT

Figure 6:
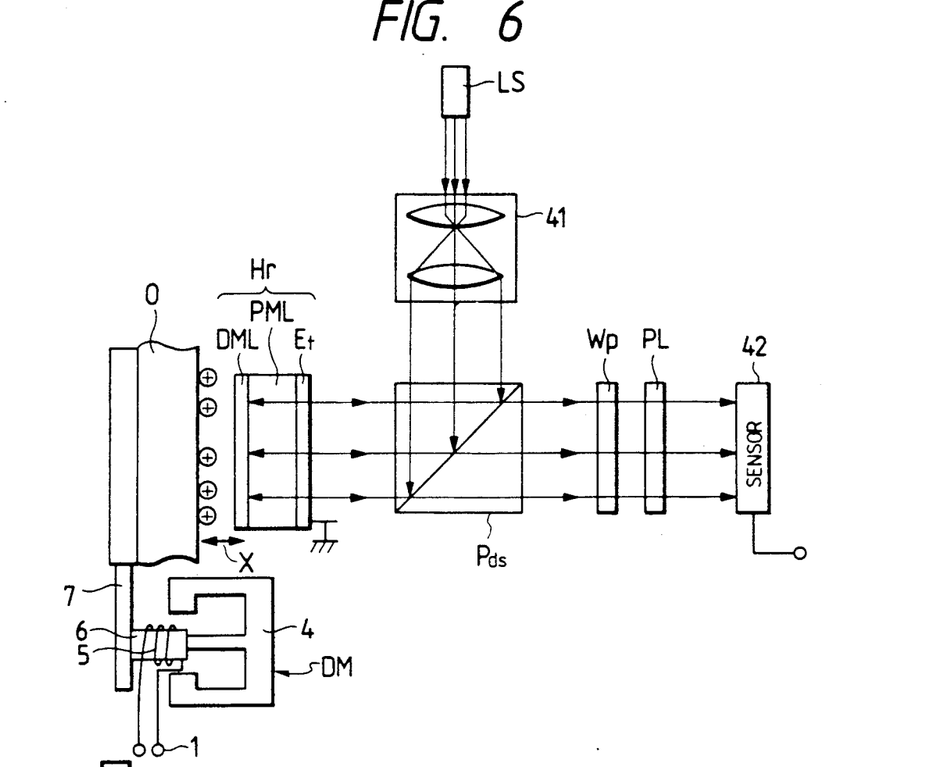
FIG. 6 is a diagram of an apparatus according to a fourth embodiment of this invention.

FIG. 6 shows a fourth embodiment of this invention which is similar to the embodiment of FIGS. 4 and 5 except for the following points.

In the embodiment of FIG. 6, a beam expander 41 is used in place of the optical deflector Pdef and the lens Lfθ. In addition, a two-dimensional image sensor 42 is used in place of the lens Lfc and the photodetector PD.

The embodiment of FIG. 6 may be modified as follows. In a first modification, the laser LS is replaced by a combination of a white light source and a polarizing plate. In a second modification, the two-dimensional image sensor 42 is replaced by a screen.

DESCRIPTION OF THE FIFTH PREFERRED EMBODIMENT

Figure 7:
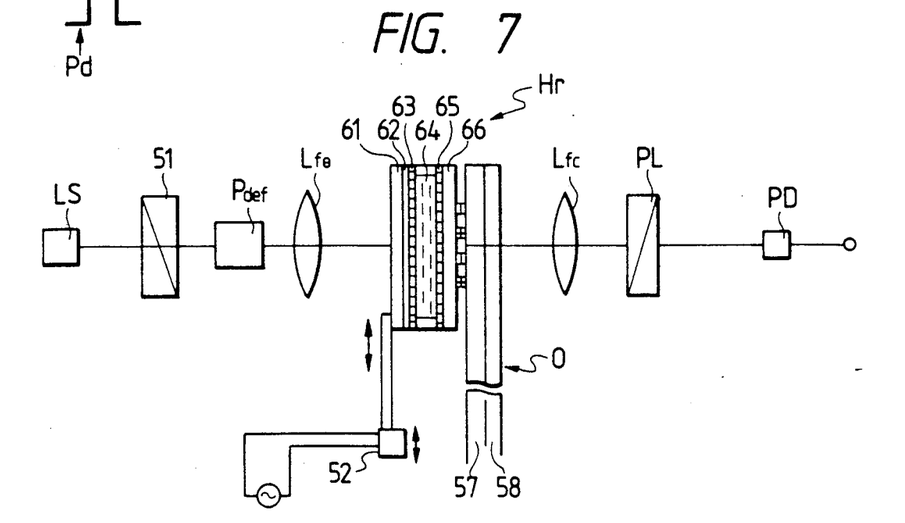
FIG. 7 is a diagram of an apparatus according to a fifth embodiment of this invention.

With reference to FIG. 7, a light source LS such as a laser emits a beam of light which travels to a lens Lfθ via a polarizer 51 and an optical deflector Pdef. The optical deflector Pdef functions to deflect the light beam to attain a scanning process. The light beam passes through the lens Lfθ and then enters a reading (sensing) or reproducing head Hr. After the light beam passes through the reading head Hr, the light beam travels to a photodetector PD via a lens Lfc and an analyzer PL. The reading head Hr opposes a measured object or a recording member O which holds a charge latent image. The reading head Hr enables the light beam to carry information related to the charge latent image formed on the recording member O. The photodetector PD derives the image information from the incident light beam. A piezoelectric element 52 supplied with an alternating voltage is mechanically coupled to the reading head Hr. The piezoelectric element 52 periodically moves back and forth the reading head Hr in a direction parallel to the active surface of the recording member O in response to the supplied alternating voltage.

Figure 8:
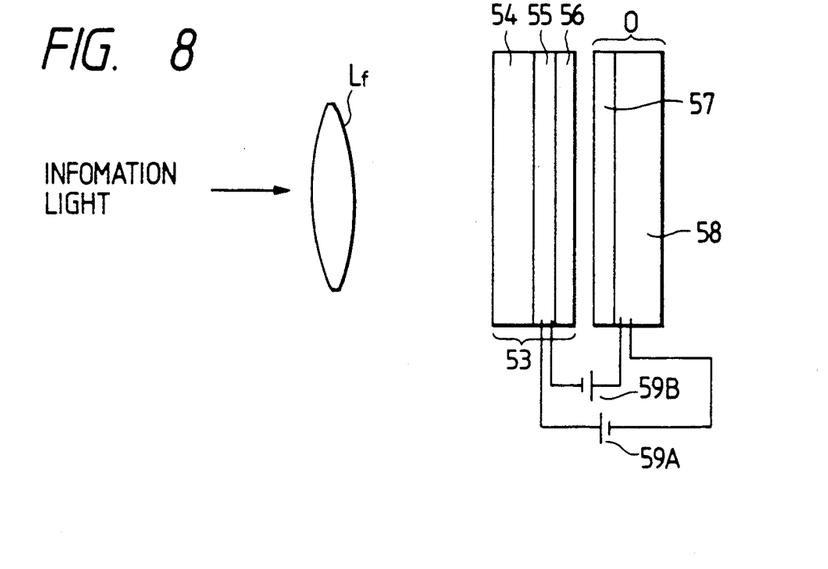
FIG. 8 is a diagram of the recording head and the recording member in the apparatus of FIG. 7.

The formation of a charge latent image on the recording member O will now be described. As shown in FIG. 8, a recording head 53 opposes the recording member O. Information light is focused on the recording head 53 by a focusing lens Lf. The recording head 53 has a laminated structure including a glass base 54, a transparent electrode 55, and a photoconductive layer 56. The transparent electrode 55 is sandwiched between the glass base 54 and the photoconductive layer 56. The glass base 54 faces the lens Lf while the photoconductive layer 56 faces the recording member O. The recording member O also has a laminated structure including a charge holding layer 57 and an electrode 58. The charge holding layer 57 of the recording member O is opposed to the recording head 53. As will be described hereinafter, the electrode 58 of the recording member O is divided into two segments. A dc power source 59A is connected between the electrode 55 of the recording head 53 and the first segment of the electrode 58 of the recording member O. Another dc power source 59B is connected between the electrode 55 of the recording head 53 and the second segment of the electrode 58 of the recording member O. As a result, an electric field is generated between the electrodes 55 and 58. The charge holding layer 57 of the recording member O is subjected to this electric field.

After the information light passes through the lens Lf, the information light enters the photoconductive layer 56 of the recording head 53 via the glass base 54 and the transparent electrode 55. The electric field applied to the charge holding layer 57 of the recording member 57 is modulated by the photoconductive layer 56 of the recording head 53 in accordance with the information light. The charge holding layer 57 of the recording member 0 undergoes the discharging process dependent upon the modulated electric field so that a charge latent image is formed on the surface of the charge holding layer 57 in accordance with the information light.

Figure 9:
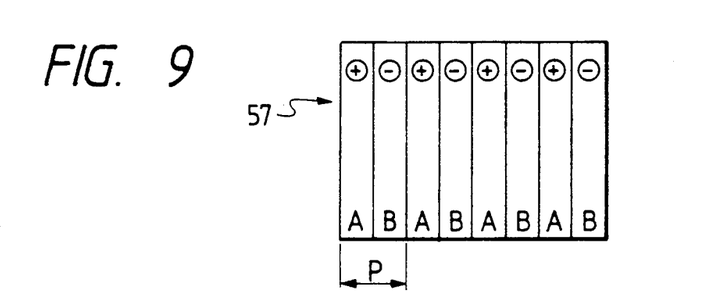
FIG. 9 is a plan view of the charge holding member in the apparatus of FIG. 7.
Figure 10:
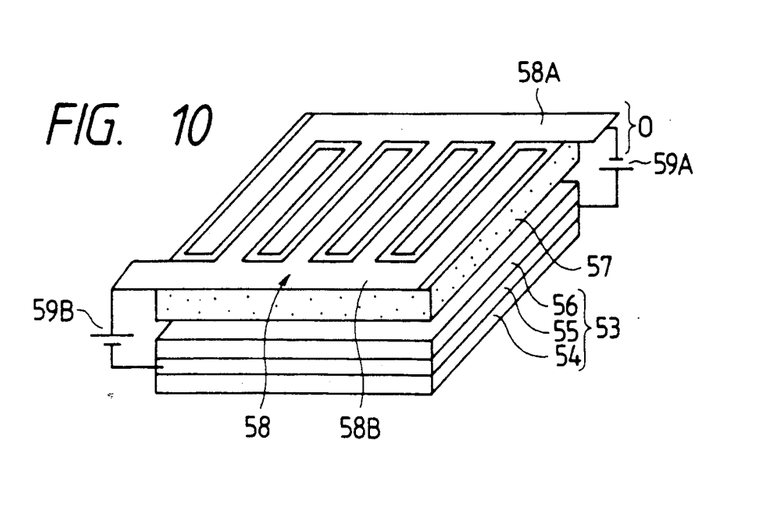
FIG. 10 is a perspective view of the recording head and the recording member in the apparatus of FIG. 7.

As shown in FIG. 9, the charge holding layer 57 of the recording member O includes positive-polarity imaging stripe regions A and negative-polarity imaging stripe regions B alternating with each other. As shown in FIG. 10, the electrode 58 of the recording member O has first and second interdigital segments 58A and 58B. The teeth of the first segment 58A extend into the spaces between the teeth of the second segment 58B. The teeth of the second segment 58B extend into the spaces between the teeth of the first segment 58A. In other words, the teeth of the first segment 58A alternate with the teeth of the second segment 58B. The dc power source 59A applies the negative potential to the first segment 58A relative to the electrode 55 of the recording head 53. The teeth of the first segment 58A function to form the positive-polarity image stripe regions A of the charge holding layer 57. The dc power source 59B applies the positive potential to the second segment 58B relative to the electrode 55 of the recording head 53. The teeth of the second segment 58B function to form the negative-polarity imaging stripe regions B of the charge holding layer 57.

Figure 11:
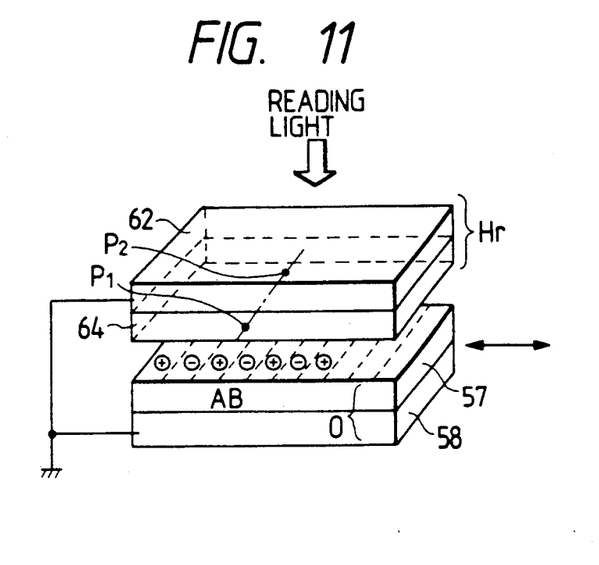
FIG. 11 is a perspective view of the reading head and the recording member in the apparatus of FIG. 7.

As shown in FIGS. 7 and 11, during the detection of the charge latent image formed on the recording member O, the reading head Hr is opposed to the recording member O. The reading head Hr has a laminated structure including a transparent base 61, a transparent electrode 62, an aligning film 63, a liquid crystal 64, an aligning film 65, and a transparent base 66. The liquid crystal 64 is sandwiched between the aligning films 63 and 65. The liquid crystal 64 is subjected to the electric field which responds to the charge latent image formed on the recording member O. The liquid crystal 64 constitutes an optical modulator. As is known, the liquid crystal 64 has the electrooptic effect. When the light beam passes through the liquid crystal 64, the light beam is modulated with the image-dependent electric field by the electrooptic effect of the liquid crystal 64.

The piezoelectric element 52 reciprocates or vibrates the reading head Hr in the direction along the active surface of the recording member O and perpendicular to the direction in which each of the stripe regions A and B extends. The stroke of the vibration of the reading head Hr is set approximately equal to half the pitch p (shown in FIG. 9) of the stripe regions A or B of the recording member O.

Figure 12:
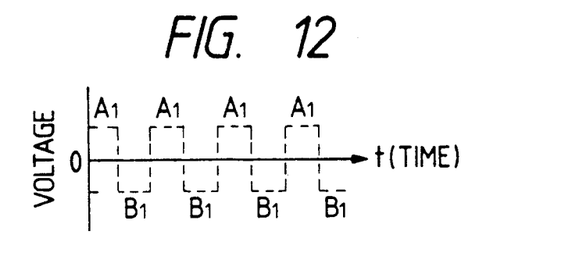
FIG. 12 is a diagram of the waveform of the potential applied to the liquid crystal in the apparatus of FIG. 7.

A consideration will now be made about the straight line P1-P2 which connects points P1 and P2 on the liquid crystal 64 and which extends parallel with each of the stripe regions A and B of the recording member O. As the reading head Hr is vibrated, the straight line P1-P2 on the liquid crystal 64 periodically moves between a first position where the straight line P1-P2 opposes one of the positive-polarity imaging stripe regions A of the recording member O and a second position where the straight line P1-P2 opposes adjacent one of the negative-polarity imaging stripe regions B of the recording member O. Therefore, as shown in FIG. 12, the electric potential at the straight line P1-P2 alternates between a positive value A1 and a negative value B1 which are determined by the signal charges on the positive-polarity image stripe region A and the signal charges on the negative-polarity image stripe region B respectively. All points of the liquid crystal 64 undergo a similar voltage change. As a result, the liquid crystal 64 is subjected to the alternating electric field. The application of the alternating electric field to the liquid crystal 64 prevents the deterioration of the liquid crystal 64 which would be caused in cases where a dc current flowed through the liquid crystal 64. It should be noted that the supply of the dc current to the liquid crystal 64 causes ionized impurities to form charge carriers oxidizing or reducing the material of the liquid crystal 64 and the electrode 62.

This embodiment may be modified as follows. In a first modification, the photodetector PD is replaced by a two-dimensional image sensor or a screen. In a second modification, an electromagnetic-type actuator is used as the mechanism for vibrating the sensing head Hr.

DESCRIPTION OF THE SIXTH PREFERRED EMBODIMENT

FIGS. 13-18 show a sixth embodiment of this invention which is similar to the embodiment of FIGS. 7-12 except for the following points.

Figure 13:
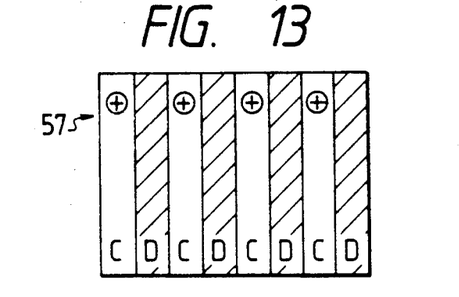
FIG. 13 is a plan view of a charge holding member in an apparatus according to a sixth embodiment of this invention.

As shown in FIG. 13, the charge holding layer 57 of the recording member O includes information-recording stripe regions C and constant-potential stripe regions D alternating with each other.

Figure 14:
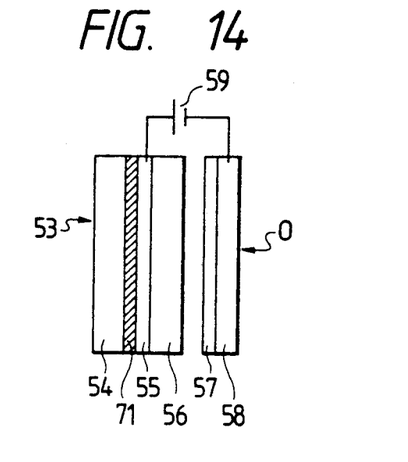
FIG. 14 is a diagram of a recording head and a recording member in the apparatus of the sixth embodiment.
Figure 15:
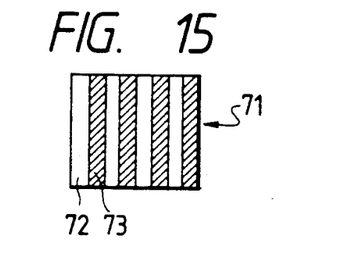
FIG. 15 is a plan view of the mask of FIG. 14.

As shown in FIGS. 14 and 15, the recording head 53 includes a mask 71 extending between the glass base 54 and the transparent electrode 55. The mask 71 has transparent stripes 72 and opaque stripes 73 alternating with each other. The transparent stripes 72 function to form the information-recording stripe regions C of the recording member O. The opaque stripes 73 function to form the constant-potential stripe regions D of the recording member O. The electrode 58 of the recording member O is composed of a single plate extending over the back of the charge holding member 57. A dc power source 59 is connected between the electrode 58 of the recording member O and the electrode 55 of the recording head 53.

Figure 16:
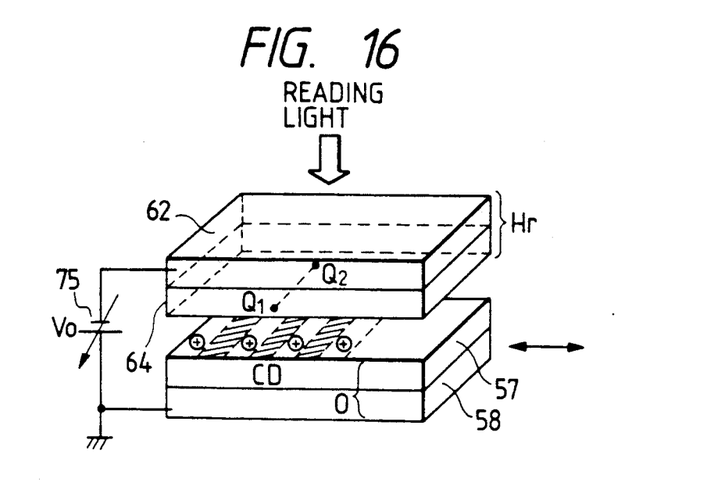
FIG. 16 is a perspective view of a reading head and the recording member in the apparatus of the sixth embodiment.

As shown in FIG. 16, during the detection of the charge latent image formed on the recording member O, the reading head Hr is opposed to the recording member O. A variable dc voltage source 75 is connected between the electrode 55 of the reading head Hr and the electrode 58 of the recording member O.

As in the embodiment of FIGS. 7-12, the reading head Hr is vibrated or reciprocated in the direction along the active surface of the recording member O. The amplitude of the vibration of the reading head Hr is set approximately equal to the pitch of the information-recording stripe regions C and the constant-potential stripe regions D of the recording member O.

Figure 17:
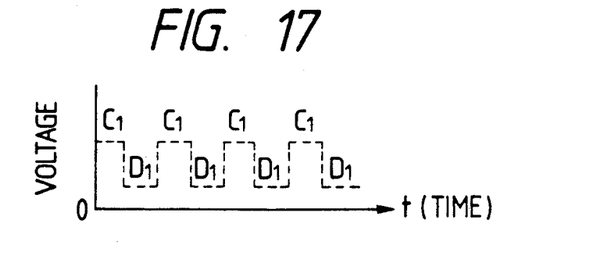
FIG. 17 is a diagram of the waveform of the potential applied to the liquid crystal of FIG. 16.

A consideration will now be made about the straight line Q1-Q2 which connects points Q1 and Q2 on the liquid crystal 64 and which extends parallel to the information-recording stripe regions C and the constant-potential stripe regions D of the recording member 0. As the reading head Hr is vibrated, the straight line Q1-Q2 on the liquid crystal 64 periodically moves between a first position where the straight line Q1-Q2 opposes one of the information-recording stripe regions C of the recording member O and a second position where the straight line Q1-Q2 opposes adjacent one of the constant-potential stripe regions D of the recording member O. Therefore, as shown in FIG. 17, the electric potential at the straight line Q1-Q2 alternates between values C1 and D1 which are determined by the signal charges on the information-recording stripe region C and the voltage at the constant-potential stripe region D respectively.

Figure 18:
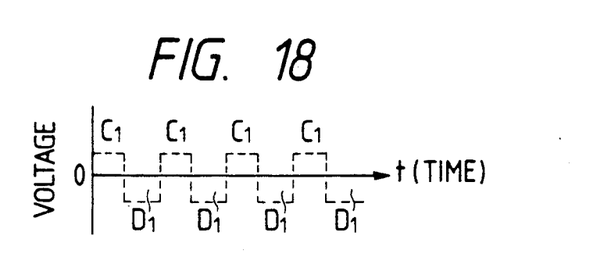
FIG. 18 is a diagram of the waveform of the potential applied to the liquid crystal of FIG. 16.

The voltage applied between the electrodes 58 and 62 by the dc source 75 is set equal to the average between the voltages C1 and D1 so that the electric potential at the straight line Q1-Q2 varies around the zero potential as shown in FIG. 18. As a result, the liquid crystal 64 is subjected to the alternating electric field which varies around the zero potential.

DESCRIPTION OF THE SEVENTH PREFERRED EMBODIMENT

Figure 19:
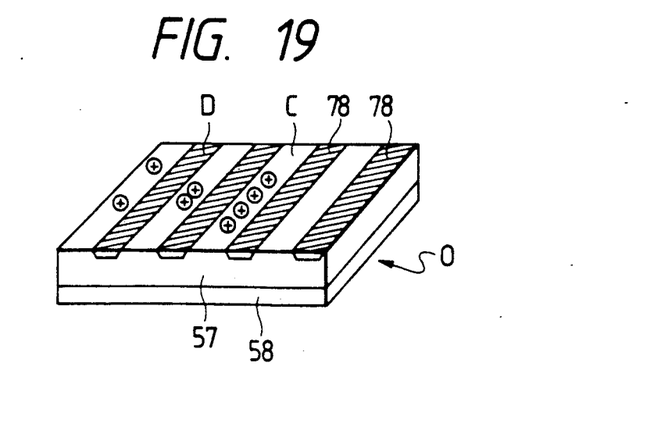
FIG. 19 is a perspective view of a recording member in an apparatus according to a seventh embodiment of this invention.

FIG. 19 shows a seventh embodiment of this invention which is similar to the embodiment of FIGS. 13-18 except for the following point.

In the embodiment of FIG. 19, equally-spaced stripe electrodes 78 are formed on the charge holding layer 57 of the recording medium O to form the information-recording stripe regions C and the constant-voltage stripe regions D. The mask 71 (see FIG. 14) is replaced by the stripe electrodes 78.

What is claimed is:

1. An apparatus for detecting a distribution of a surface potential on a measured object, comprising:
    a light source emitting light;
    a sensing head opposing the measured object and including an optical modulator layer for modulating the light emitted from the light source and outputting light, a transparent electrode for applying an electric field to the optical modulator layer, and a dielectric mirror for reflecting the light after the light passes through the optical modulator layer;
    means for applying the light from the light source to the sensing head;
    means for detecting the light outputted from the sensing head;
    means for periodically moving the sensing head relative to the measured object between a first position and a second position separated from the measured object by different distances respectively;
    a line memory;
    means for enabling the sensing head to scan one line of the measured object while the sensing head is in the first position;
    means for writing an output signal from the light-detecting means into the line memory while the sensing head is in the first position;
    means for enabling the sensing head to scan said line of the measured object while the sensing head is in the second position;
    means for reading out the written signal from the line memory while the sensing head is in the second position; and
    means for subtracting the output signal from the light-detecting means from the read out signal while the sensing head is in the second position.

2. An apparatus comprising:
    a recording member having first regions and second regions alternating with each other, the first regions having first-type potentials and the second regions having second-type potentials different from the first-type potentials;
    means for forming a charge latent image on the recording member in accordance with an information signal;
    a reading head opposing the recording member and including an optical modulator subjected to an electric field representative of the charge latent image; and
    means for reciprocating the reading head relative to the recording member along a surface of the recording member to vary the electric field applied to the optical modulator in an alternating manner.

* * * * *